US009848293B2

(12) United States Patent
Murray et al.

(10) Patent No.: US 9,848,293 B2
(45) Date of Patent: Dec. 19, 2017

(54) METHOD AND APPARATUS FOR DEFINING A ZONE

(75) Inventors: Sara Elizabeth Murray, Aylesbury (GB); Jose Antonio Sanchez-Valenzuela, Aylesbury (GB); Gareth John Carter, Aylesbury (GB)

(73) Assignee: BUDDI LIMITED, Buckinghamshire (GB)

(*) Notice: Subject to any disclaimer, the term of this patent is extended or adjusted under 35 U.S.C. 154(b) by 0 days.

(21) Appl. No.: 14/000,993

(22) PCT Filed: Feb. 22, 2012

(86) PCT No.: PCT/GB2012/050406
§ 371 (c)(1),
(2), (4) Date: Mar. 4, 2014

(87) PCT Pub. No.: WO2012/114109
PCT Pub. Date: Aug. 30, 2012

(65) Prior Publication Data
US 2014/0179347 A1    Jun. 26, 2014

(30) Foreign Application Priority Data
Feb. 23, 2011 (GB) .................................. 1103128.3

(51) Int. Cl.
*H04W 4/02* (2009.01)
*G01S 5/00* (2006.01)
*H04W 64/00* (2009.01)
*G01S 19/14* (2010.01)

(52) U.S. Cl.
CPC .......... *H04W 4/021* (2013.01); *G01S 5/0027* (2013.01); *G01S 19/14* (2013.01); *H04W 64/00* (2013.01)

(58) Field of Classification Search
CPC ..... H04W 4/021; H04W 64/00; G01S 5/0027; G01S 19/14
USPC .......................................... 455/456.1–456.6
See application file for complete search history.

(56) References Cited

U.S. PATENT DOCUMENTS

| 7,945,272 | B2* | 5/2011 | Kim ........................... 455/456.2 |
| 2003/0001779 | A1* | 1/2003 | Mintz et al. .................. 342/463 |
| 2006/0027185 | A1 | 2/2006 | Troxler |
| 2006/0030333 | A1 | 2/2006 | Ward et al. |
| 2006/0270421 | A1 | 11/2006 | Phillips et al. |
| 2007/0173265 | A1 | 7/2007 | Gum |

(Continued)

FOREIGN PATENT DOCUMENTS

| JP | 2010246015 | 10/2010 |
| JP | 2010267074 | 11/2010 |
| WO | 2007145625 | 12/2007 |

*Primary Examiner* — Brandon Miller
(74) *Attorney, Agent, or Firm* — Lowe Graham Jones PLLC (57) ABSTRACT

A method of and apparatus for defining a zone, comprising receiving (S3) location data indicative of the location of a device 2 at a plurality of times, determining (S14), based on the location data, information relating to the occupancy of the device in a plurality of geographical regions, and defining (S15), based on the information, at least one zone. The or each zone consists of multiple contiguous regions of the geographical regions in which the occupancy of the device meets at least one criterion. Each of the plurality of predetermined geographical regions is defined independently of location areas over which base stations transmit and receive.

19 Claims, 8 Drawing Sheets

(56) References Cited

U.S. PATENT DOCUMENTS

| | | |
|---|---|---|
| 2007/0226314 A1 | 9/2007 | Eick et al. |
| 2007/0257831 A1* | 11/2007 | Mathews ................ G01S 5/021 342/22 |
| 2008/0125965 A1* | 5/2008 | Carani et al. ................. 701/207 |
| 2008/0162034 A1 | 7/2008 | Breen |
| 2009/0164118 A1 | 6/2009 | Breen |
| 2009/0216775 A1* | 8/2009 | Ratliff .................... G06Q 10/08 |
| 2009/0258656 A1* | 10/2009 | Wang ..................... H04W 4/02 455/456.1 |
| 2009/0325606 A1* | 12/2009 | Farris ..................... H04W 4/02 455/456.3 |
| 2010/0203901 A1 | 8/2010 | Dinoff et al. |

\* cited by examiner

| Event time | Minutes | Square |
|---|---|---|
| 24/11/2010 19:00 | 0 | B1 |
| 24/11/2010 20:00 | 60 | B1 |
| 24/11/2010 20:02 | 2 | B5 |
| 24/11/2010 20:03 | 1 | F5 |
| 24/11/2010 20:04 | 1 | H5 |
| 24/11/2010 21:04 | 60 | H5 |
| 24/11/2010 22:04 | 60 | H5 |

METHOD AND APPARATUS FOR DEFINING A ZONE

FIELD OF THE INVENTION

The invention relates to a method of and apparatus for defining a zone. The invention also relates to a computer program for defining a zone.

BACKGROUND

It is necessary or desirable to monitor location of certain people. For example, it may be desirable to monitor the location of a mentally ill person or criminal, particularly whether such a person enters or leaves a particular zone. Inputting a zone using a graphical user interface interacting with a mapping overlay system on a website and then transmitting data defining the zone to a device worn by a person to be monitored is known. In this case the device may send an alert if the person enters or exits that zone. However, defining a zone in such a way is difficult and the boundaries of the zone as defined may not reflect where the boundaries are in actuality. In addition, defining the zone manually is time-consuming. It is an object of the present invention to address these difficulties.

SUMMARY OF THE INVENTION

In accordance with a first aspect of the present invention, there is provided a method of defining a zone, comprising receiving location data indicative of the location of a device at a plurality of times, and defining, at a processor, based on the location data, at least one zone in which the occupancy of the device meets at least one criterion.

Thus, such a zone is automatically defined and accurately reflects where a person carrying the device spends his or her time in accordance with the at least one criterion, for example a large proportion of his or her time. Thus, in an implementation where the location of a mentally ill person is monitored, a zone could be automatically defined for a person's home or care home or an area of a care home in which the person spends a large proportion of his or her time. In another implementation where the location of a criminal released for work is monitored, zones could be automatically defined for the workplace and a prison.

Preferably, the defining the at least one zone comprises defining, based on the location data, information relating to the occupancy of the device in a plurality of geographical regions, and determining, based on the information, the at least one zone, wherein the or each zone consists of one or multiple contiguous regions of the geographical regions in which the occupancy of the device meets the at least one criterion.

The method may further comprise determining that at least two geographical regions in which the occupancy of the device meets the at least one criterion are contiguous. Advantageously, the information comprises an occupancy value for each of the geographical regions, and the method further comprises determining in each geographical region that the occupancy of the device meets the at least one criterion by comparing the occupancy value for each geographical region to a threshold occupancy value and determining based on a result of the comparison.

The determining an occupancy value for each of the geographical regions may comprise determining, based on the location data for each time, at least one geographical region to which a value should be assigned, assigning a value to the determined at least one geographical region, and summing the assigned values for each of the geographical regions to give the occupancy value. The determining the value to be assigned to the or each geographical region may be in dependence on an initial value.

The method may further comprise determining if the location data for a time is indicative of a location of the device in the vicinity of multiple geographical regions, and, if so, determining a value to assign to each of the multiple geographical regions. The multiple geographical regions may comprise one, two, three or four of the geographical regions. Where a value is determined for multiple geographical regions for location data for a time, the value assigned to each of the multiple geographical regions may be a proportion of the initial value.

The following information may advantageously be stored in a computer readable storage medium: information identifying the or each zone; information identifying the device; and information identifying start time and end time for the time period over which the location data indicates location of the device.

The initial value may be a predetermined value for the location data for each time. Alternatively, the initial value may be dependent on a determined time value indicative of time spent by the device in the at least one geographical region. The time value may be dependent on the time interval between the times of consecutive location data.

The method may further comprise determining, at the processor, based on the location data, at least one secondary zone in which the occupancy of the device meets at least one other criterion, wherein the at least one other criterion is different to the at least one criterion that must be met for determining of the at least one zone. This allows better characterisation of movement of a tracked person.

The at least one other criterion may comprise a secondary threshold occupancy value, wherein determining at least one secondary zone may comprise determining that the occupancy value for a region is greater than the secondary threshold occupancy value and less than the threshold occupancy value.

Advantageously, the method may comprise assigning at the processor to the or each zone a name identifying the zone. Alternatively, the method may comprise causing a request to be provided to a user inviting the user to provide a name for a zone.

Preferably the plurality of times are over a plurality of days, and the location data is indicative of the location of the device at multiple times over each of those days.

The plurality of geographical regions may comprise regions of substantially equal size. Each region preferably has an area of between 1000 and 40,000 $m^2$, preferably still 2000 to 5000 $m^2$. Each of the plurality of predetermined geographical regions may be defined independently of location areas over which base stations transmit and receive.

There is also provided a method for determining a time dependent zone, comprising, for each of a plurality of time periods, the method of any one of the preceding claims, wherein the receiving of location data indicative of the location of the device for a plurality of times comprises receiving such location data indicative of the location of the device for a plurality of times in each time period, and the determining at least one zone, based on the location data for the respective plurality of times comprises determining at least one zone in which the occupancy of the device meets at least one criterion.

The above mentioned steps may further comprise receiving further location data indicative of the location of the device at a plurality of other times over another time period, determining, based on the further location data, information relating to the occupancy of the device in a plurality of geographical regions over the other time period, and determining matching information indicative of a difference between the information based on the location data and the information based on the further location data. The determining the matching information may be based on a result of determining the at least one zone and optionally at least one secondary zone. The matching information may indicate that movement of the device over the other time period is typical or atypical if the matching information indicates deviation from a normal pattern of movement.

The method may further comprise determining that the matching information meets at least one condition, and generating a notification for a user based on a result of the determining. For example, the matching information might trigger an alert for a third party such as the police.

In an embodiment, the method further comprises generating a heat map indicating the geographical regions and providing a visual indication of degree of occupancy of each geographical region, and providing the heat map for display on a display. The heat map facilitates understanding of the past whereabouts of a tracked person by a user. The user can understand the significance of a large amount of location data quickly and simply and familiarise themselves with areas visited by the tracked person and identify patterns.

In another embodiment, the method may further comprise receiving other location data indicative of the location of the device at another time, and performing at least one action based on the determined at least one zone and the other location data. The at least one action may comprise determining that the device has entered or left the at least one zone based on the other location data, and causing a notification to be sent to a party.

As will be understood, the method is computer-implemented. There is also provided a computer program comprising computer program code means adapted to perform all the steps mentioned above when said program is run on processing apparatus. The computer program may be embodied on a computer readable medium.

According to a second aspect of the invention, there is provided apparatus for defining a zone, comprising means for receiving location data indicative of the location of a device at a plurality of times, and means for defining, at a processor, based on the location data, at least one zone in which the occupancy of the device meets at least one criterion. The apparatus may further comprise the device, wherein the device is configured to determine the location data and to send the location data to the means for receiving. The apparatus may further comprise a user terminal arranged to enable a user to view the location data or derivatives thereof. The apparatus may further comprise means configured to perform any of the steps of according to the first aspect of the invention.

According to a third aspect of the invention, there is provided an electronically displayed heat map indicating a plurality of geographical regions, and a visual representation of information relating to occupancy of a device in each geographical region. The heat map may include an indication of at least one zone, wherein the or each zone consists of one or multiple contiguous regions of the geographical regions in which the occupancy of the device meets at least one criterion. The heat map may further include an indication of at least one secondary zone, wherein the or each secondary zone consists of one or multiple contiguous regions of the geographical regions in which the occupancy of the device meets at least one other criterion which is different to said criterion. There is also provided a web page generated in a web browser in accordance with computer program code means executed by a processor, including such a heat map.

According to a fourth aspect of the invention, there is provided a method of causing to display a heat map representing occupancy of a device in a plurality of geographical regions, comprising determining, at a processor means, a graphic representation for the occupancy of the device in each geographical region, and causing to display on an electronic display a heat map, wherein the occupancy of the device in each geographical region is represented by the corresponding graphic representation.

According to a fifth aspect of the invention, there is provided apparatus for causing to display a heat map representing occupancy of a device in a plurality of geographical regions, comprising determining means for determining a graphic representation for the occupancy of the device in each geographical region, and processing means for causing to display on an electronic display a heat map, wherein the occupancy of the device in each geographical region is represented by the corresponding graphic representation. The means for determining may be arranged to determine, based on location data, information relating to occupancy of a device in each geographical region, wherein the determining a graphic representation for the occupancy of the device in each geographical region is based on said information.

BRIEF DESCRIPTION OF THE FIGURES

Embodiments of the invention will now be described, by way of example only, with reference to the accompanying drawings in which.

DETAILED DESCRIPTION OF EMBODIMENTS

Figure 1:
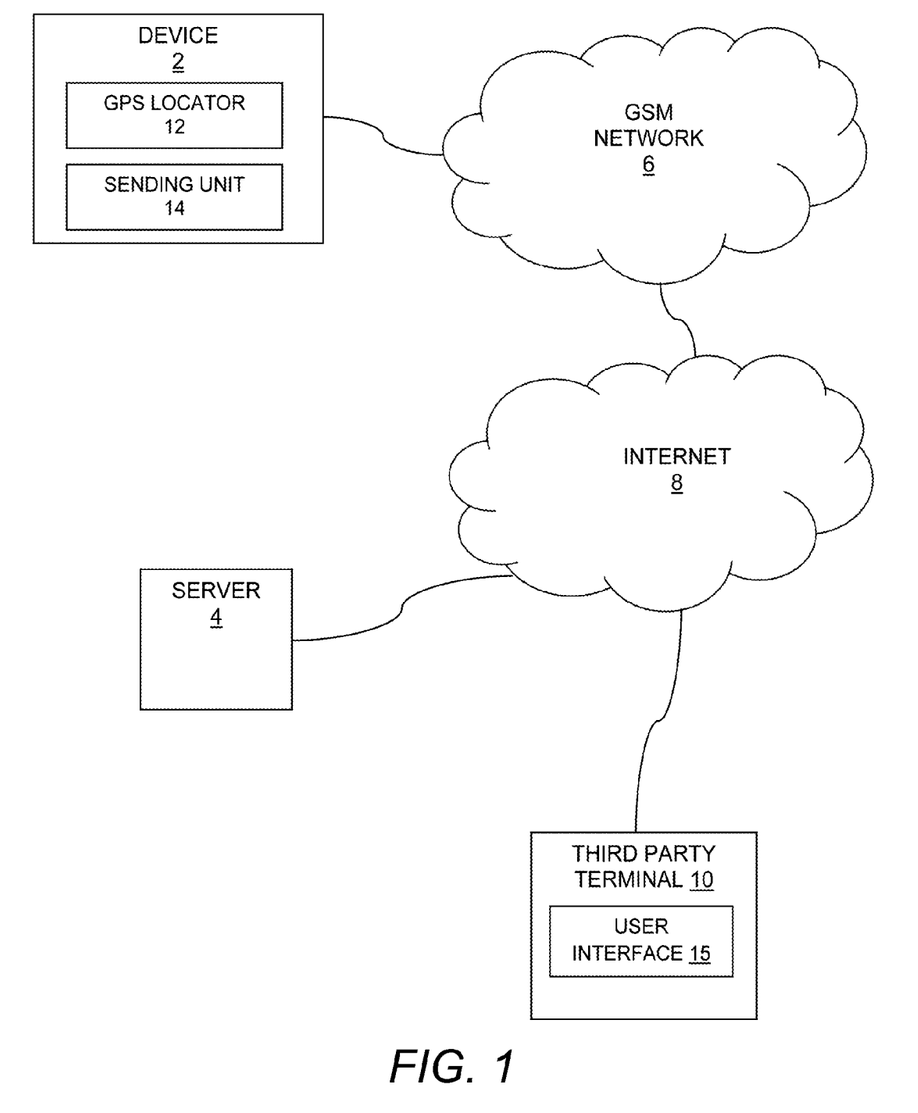
FIG. 1 is a schematic diagram of a system for determining zones, including a server, a device and a terminal in accordance with embodiments of the present invention.

Referring to FIG. 1, in this embodiment the system comprises a device 2 configured to transmit location data to a server 4 via a wireless communications network 6 and the internet 8. In this embodiment the wireless communications network is a GSM communications network, but the invention is not limited by the kind of network or networks with which the device 2 communicates. For example, the device 2 may be configured to communicate with a CDMA network, a Metropolitan Area Network, or a Local Area Network with appropriate range. The invention is also not limited to including any particular kind of network or networks that the location data passes through on the way to the server 4.

The server 4 is configured to receive the location data and for communication with a user terminal 10, via for example, the internet and/or Ethernet. FIG. 1 indicates one device and one user terminal, but it will be understood that the server 4 is configured to receive and handle location data from a plurality of devices and to communicate with many third party terminals.

In this embodiment, a geographical area over which tracking of the device 2 takes place is divided into geographical regions. Each of the geographical regions comprises an area of substantially equal size. The size of the regions is predetermined at least in dependence on the accuracy with which the location data indicates location and on likely zone size. Each region is typically at least 25 m$^2$, preferably at least 1000 m$^2$, preferably still at least 2000 m$^2$, and typically less than 5000 m$^2$, preferably less than 40,000 m$^2$. The geographical regions are defined independently of location areas over which base stations transmit and receive. It is noted that herein the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The device 2 includes a GPS locator 12 and a sending unit 14. In an implementation the device 2 would typically include many more elements, as will be appreciated by a person skilled in the art. The GPS locator 12 is capable of receiving signals in accordance with the Global Positioning System (GPS), processing those signals to determine location data indicative of the location of the device 2 at a particular time, and providing that location data to the sending unit 14. Preferably the GPS locator 12 determines location data periodically. The sending unit 14 includes at least one processor (not shown) and at least one memory (not shown) for storing location data to be sent and computer code comprising instructions executable by the at least one processor, and is configured to transmit the location data under the control of the at least one processor executing the instructions. The sending unit 18 is configured to receive location data from the GPS locator 12 and to transmit a message including the location data to the server 4. The location data includes an indication of the time at which the location is indicated by the location data in the form of a time stamp.

Although the device 2 includes a GPS locator for determining location data, there are many other ways that the location (or approximate location) of the device 2 might be determined. Embodiments of the invention are not limited to any particular way of generating location data. The device 2 could determine location using another kind of global satellite navigation system (GSNS). Other techniques for determining location could also be used, for example analysis of characteristics of signals to and/or base stations in a surrounding mobile communications network 6. The location data does not have to be determined at the device; it could be determined in a wireless communications network, or at the server 4. Methods of determining the location of a device are known in the applicable art.

In an embodiment, the device 2 includes a locking band (not shown) enabling locking of the device 2 to a limb of a person whose location is to be tracked. In this case, the band will be releasable by a third party, for example, a health career or a probation officer. In an alternative embodiment, the band is removable by its wearer. In another alternative embodiment, the device is a mobile device that is typically carried for a substantial proportion of each day by a person, such as a mobile telephone or PDA or a tablet device.

The user terminal 10 is typically a computer having an associated user interface 15 comprising input means and a display, one or more processors (not shown) and one or more memories (not shown). Web browser code is stored in the memory so that, when run on the processor, a web browser can be operated by a user to display web pages. The web browser can be operated to obtain web page information from the server 4 and to display corresponding web pages on the display. Preferably an authorisation and authentication system is provided so that only persons authorised to view tracking information for a particular person or persons may do so. The user terminal may be a mobile device, for example a mobile phone, PDA, laptop or tablet device.

Figure 2:
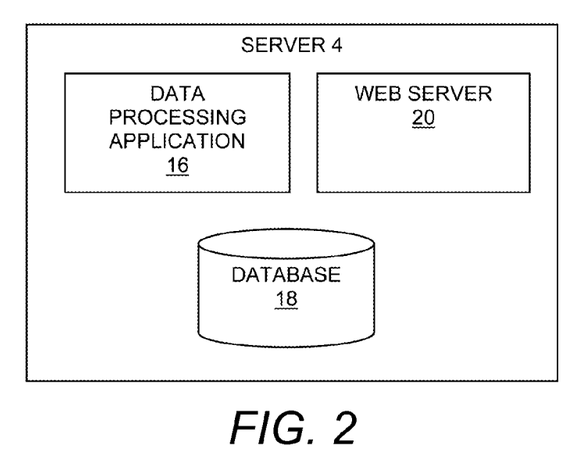
FIG. 2 is a schematic diagram indicating elements of the server of FIG. 1.

Turning to FIG. 2, the server 4 has thereon a data processing application 16, a database 18 and a web server 20. The data processing application 16 provides the functionality for receiving and processing location data and determining a zone in accordance with the steps to be described, where appropriate interfacing with the database 18 and the web server 20. The data processing application 16 is implemented by suitable computer program code (not shown) stored in a suitable storage medium (for example a hard disc) and which, when executed by suitable processing apparatus (not shown), causes the server 4 to provide the functionality described herein. The processing apparatus can be a single processing apparatus or a number of networked processing apparatuses networked by any conventional communications network. The data processing application 16 can be in the form of one or several modules providing aspects of the functionality of the server 4. Alternatively, the data processing application 16 could be implemented in dedicated processing equipment or a mixture of dedicated hardware and software.

The server 4 is configured to enable a third party at a user terminal 10 to access the location data and/or derivatives thereof. The web browser at the user terminal 10 interfaces with the server 4 for generation of appropriate Internet pages. Static web pages and the web page templates are provided in a static web page and templates store (not shown) associated with the web server.

Figure 3:
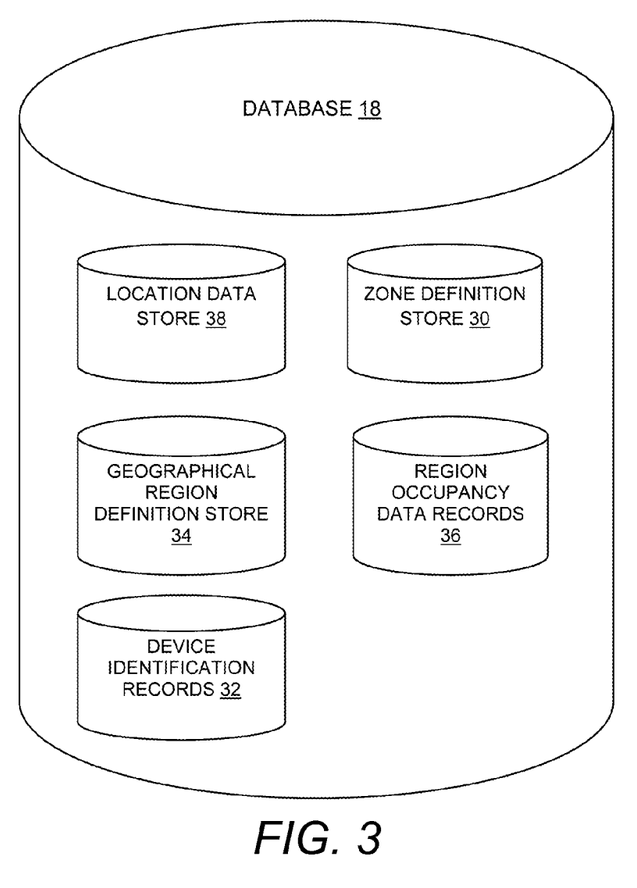
FIG. 3 is a schematic diagram of the data provided in a database in the server.

Referring to FIG. 3, the database 18 includes a location data store 30 for storing the received location data for each tracked device and a device identification store 32 for storing at least details associated with a tracked person carrying the device 2 (which may not include the tracked persons' names if anonymity is required). Information identifying each geographical region is stored in a geographical region definition store 34.

The database 18 also includes a region occupancy data records 36 storing information associated with the occupancy of the device 2 in each geographical region for each time at which location data is valid, and a zone definition store 38 in which information identifying the zone in which the location data indicates that the device 2 has a high occupancy. The roles of these stores will be described further below. It should be noted that other data stores may be included in the database in implementation and/or the mentioned data stores may be modified. The database 18 may be implemented using MySQL. The level of occupancy of each of the geographical regions over a given time period is defined by respective occupancy values.

The server 4 is configured to determine, based on the location data, at least one zone in which the occupancy of the device meets at least one criterion, in this embodiment the at least one criterion defining the occupancy being high. In an embodiment, this is achieved by first determining, based on the location data, information relating to the occupancy of the device in a plurality of geographical regions, and then determining, based on the information, the at least one zone. The or each zone consists of one or multiple contiguous regions of the geographical regions in which the device has a high occupancy. The level of occupancy that is "high occupancy" may be application dependent.

Figure 4:
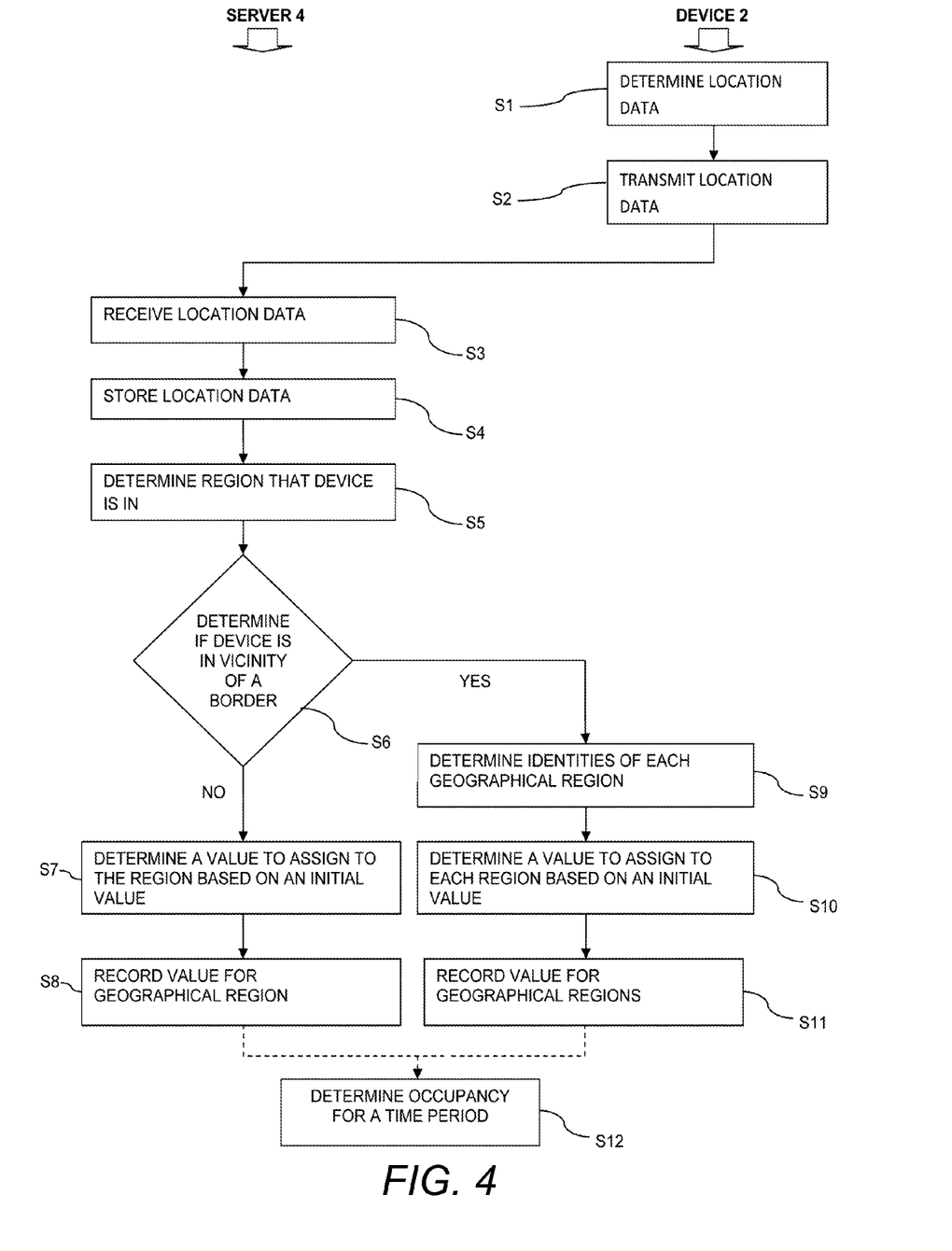
FIG. 4 is a flow chart indicating steps that take place in the device and server in accordance with embodiments to determine occupancy values.

Ways in which the occupancy values can be determined will now be described with reference to FIG. 4. At step S1 the device 2 determines in the GPS locator 12 location data indicative of the location of the device at a particular time. The GPS locator 12 provides the location data to the sending unit 14, which sends at step S2 the location data to the server 4 in a message via the wireless communications network 6 and the internet 8. The message includes an identifier of the device (typically the International Mobile Equipment Identity).

The server 4 receives the location data from the device 2 and stores the location data in the location data store 30 of the database 18 (steps S3 and S4).

In step S5, the server 4 determines the region that the location data indicates that the device 2 is in.

It will be appreciated that the location data indicates location with a degree of error. Thus, when the location data indicates that the device 2 is near the border of two or more geographical regions, it cannot be certain in which of these regions the device 2 is located. In step S6 the server 4 determines whether the location of the device 2 indicated by the location data is in the vicinity of multiple geographical regions, in dependence on an error value. The error value can be preset, provided by the GPS locator, or otherwise. If the server 4 determines that the device 2 is not in the vicinity of a border, the server 4 proceeds to step S7.

At step S7, the server 4 determines a value to be assigned to the geographical region determined in step S5. In the present embodiment, an initial value is preconfigured and this value is taken as the value to be assigned. The value may be calculated in different ways in variant embodiments.

At step S8, the geographical region occupancy records 36 in the database 18 are modified at the server 4 to record the value assigned against an identifier of the corresponding region.

If, at step S6, the server 4 determines that the location of the device 2 indicated by the location data is in the vicinity of multiple geographical regions, the server 4 proceeds to step S9. At this step the server 4 determines the identity or identities of nearby regions. If the geographical regions are defined so that the geographical regions are formed of a grid of squares or rectangles or other regular four sided areas, the server 4 can determine that there are one or three nearby geographical regions. If the geographical regions are defined so that the geographical regions are hexagonal, the server 4 can determine that there are one or two nearby geographical regions. The geographical regions can be otherwise shaped and the number of geographical regions that the device 2 may be near is dependent on the shape of the geographical regions.

The multiple geographical regions consist of the geographical region in which the device 2 is located and the or each geographical region in which it is determined in step S9 that the location data indicates that the device 2 is in the vicinity of the border of. At step S10 a value to be assigned to each of the multiple geographical regions is determined based on the initial value. The value assigned to each of the multiple geographical regions is a proportion of the initial value. The value assigned to each of the multiple geographical regions may be the initial value divided by the number of multiple geographical regions.

In a modification, the value assigned in step 10 to each of the multiple geographical regions may be otherwise based on the initial value. In particular, the values assigned may be weighted in favour of the region determined in step S5.

At step S11, the region occupancy data records in the database 18 are modified to record each value assigned against an identifier of the respective geographical region.

For example, where the geographical regions are defined as a square or rectangular grid, the initial value can conveniently be set at four. If, at step S6 the server 4 determines that the location data indicates that the device 2 is not located in the vicinity of a border, a value of four is recorded in step S8. If, at step S6, the server 4 determines that the location data indicates that the device 2 is located in the vicinity of a border with one other geographical region, a value of two is determined in step S10 and then assigned in step S11 to each geographical region. If, at step S6, the server 4 determines that the location data indicates that the device 2 is located in the vicinity of three other geographical regions, a value of one is determined in step S10 and then assigned in step S11 to each geographical region.

Steps S1 to S7 are repeated for location data received for each time so that the region occupancy data records contain a value assigned to a geographical region for several times over a time period, preferably a sufficient number of times so that the values are sufficient for a pattern for the location of the device to be generated. The time period will typically be several days, weeks or months.

At step S8 the values recorded for each geographical region for a time period are summed to give an occupancy value. It is to be noted that in this embodiment the occupancy value is dependent on the number of times that location data for a unique time has been received.

At step S12 the assigned values for each region are summed at the server to give an occupancy value. The occupancy value data for a device for a given time period may be generated as a .csv file. In this embodiment, step S12 is performed periodically at the end of predetermined intervals, for example at the end of each day, and summed values recorded over a predetermined time period, for example four weeks in the occupancy value data store 39. In alternative embodiments, the server 4 can additionally or alternatively be configured so that occupancy values are calculated by summing the assigned values from a given date (for example the date of supervised release of a criminal from prison), or the occupancy value can be calculated on receipt of a request from the third party user terminal 10, which may specify a time period over which the occupancy value is to be calculated.

In some embodiments, steps S6 to S11 may be absent.

The embodiments so far described may be modified in steps S7 and S10 so that the initial value is not a predetermined value, but is determined based on at least one criterion. Thus, an additional step (not shown) of determining an initial value is present before step S7 and S10 (for embodiments in which steps S6 and S9 to S11 are present).

In some such modified embodiments, the initial value is dependent on the length of time between consecutive times for which location data indicates location. This additional step comprises, in an embodiment, computing the time interval between consecutive times and determining the initial value based on the time interval. In other words, a first time T1, at which first location data indicates that the device 2 has a first location, is subtracted from a later second time at which second location data indicates that the device has a second location to give the time interval. The initial value is then based on the time interval, for example, if the time interval is one minute, the initial value might be 60. A value or values to assign to the or each region is then computed in accordance with the step S7 and step S10 (where step S10 is present). Notably, if location data indicates that the device 2 is in a particular geographical region at consecutive times, it is assumed that the device 2 has been in that region over the whole time interval between those consecutive times. If at the consecutive times the location data indicates that the device is in two different regions, the initial value may be distributed between the two different regions and optionally each region in a straight line therebetween.

Thus, the occupancy value may be dependent on the number of instances of received location data indicating that the device is in a geographical region, or in the vicinity thereof, at unique times, or it may be dependent on the time interval between consecutively time stamped location data. The occupancy value may be dependent on both of these. The occupancy value may also be determined in other ways.

Figure 5:
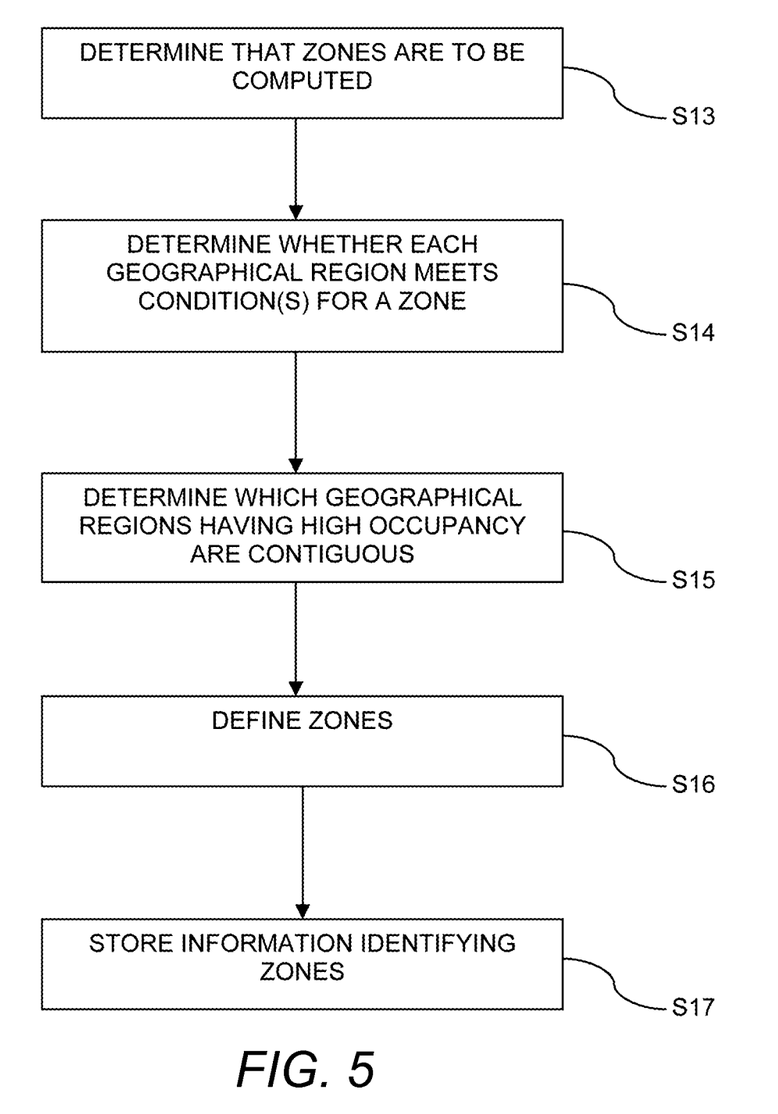
FIG. 5 is a flow chart indicating steps that take place in the server in accordance with the embodiment of FIG. 1 to determine a zone.

FIG. 5 indicates steps that are performed in embodiments to determine at least one zone of high occupancy based on the occupancy values. At step S13, the server 4 determines that zones are to be searched for. The server 4 then determines in step S14 for each geographical region whether at least one criterion for high occupancy is met.

In the present embodiment, a criterion is that the occupancy value exceeds a threshold occupancy value. In other embodiments, the criterion is that the occupancy value indicates that the device has spent a threshold length of time in a region. In another embodiment, the occupancy values for all regions are summed and a geographical region is determined to have high occupancy if the occupancy value for that region is greater than a threshold proportion of the summed occupancy values. A user at the third party user terminal 10 may be able to configure the at least one criterion. Each geographical region may have to meet more than one criterion to meet requirements for a zone.

At step S15, the server 4 then determines whether any of the geographical regions of high occupancy are contiguous, that is, connected at a border.

In step S16, any one or multiple contiguous regions of the geographical regions in which the device has a high occupancy are defined as zones and are allocated a zone identifier. Information identifying the zone is then recorded in the zone definition store 36 at step S17. The information includes:
  an identifier of the device 2;
  the start time of the time period relating to the set of location data;
  the end time of the time period relating to the set of location data;
  a zone identifier for each zone, such that each zone is uniquely named;
  information geographically identifying the zone, for example, in terms of the zone's vertices in latitude and longitude; and
  processing time.

Preferably at least one action is performed in dependence on the determined at least one zone. For example, based on subsequently received location data, the server 4 can determine that the device 2 has entered or left a zone. The server may be configured to cause a notification to be sent to a third party based on a result of the determining.

In an alternative embodiment of the invention in a modified step S15 the one or multiple contiguous regions of the geographical regions in each of which the occupancy of the device meets the at least one criterion are candidate zones. In an additional step S14' (not indicated in FIG. 5), after step S15, the server 4 determines whether the candidate zones meet at least one further criterion. In this case, the at least one further criterion is that the or the sum of the occupancy values in the or each candidate zones exceeds a predetermined value. The predetermined value may be input by a user or preconfigured, and may be an absolute value, a minimum length of time or a proportion of the summed occupancy values for all regions over a time period. If the predetermined value is exceeded for a candidate zone, the candidate region is defined as a zone in step S16. Otherwise the candidate zone is discarded.

The server 4 can assign a name to the or each determined zone, for example "zone 1". The server can be configured to provide a request to a user inviting the user to replace the name. Alternatively, instead of the server assigning a name, the server can be configured to send a message to the user requesting a name. In either case, the user terminal is configured to enable the user to submit a name in response, for example, "Home" or "Work". The server 4 can also be configured to store the details of the at least one zone as potential zones pending approved by a user. Where the user disapproves a potential zone, this is recorded and the server 4 does not treat the disapproved zone as a zone. If the user approves the potential zone, it is then recorded as a valid zone.

In a further step, the server 4 determines modified boundaries for a zone based on a best fit of the zone. For example, the modified boundaries might be in the form of a circle, ellipse, square, rectangle, or by a polygon of fewer than eight vertices. Optionally, the determining is dependent on occupancy values in regions adjacent the zone.

In this embodiment, a third party can access at least some information contained in the database 18 from the third party terminal 10. In this embodiment the web server is configured so that the third party can view a heat map of the location of the device 2 over the time period for which the occupancy values are valid. Alternatively, the third party can input the time period over which the heat map is to be generated. The heat map is a graphical representation of the geographical regions, for example in the form of a grid, together with a visual indication of information relating to occupancy of the device in each geographical zone. The graphical representation of the geographical regions may be limited to covering the general area in which the device was located over the time period, for example, a square kilometer.

Figure 6:
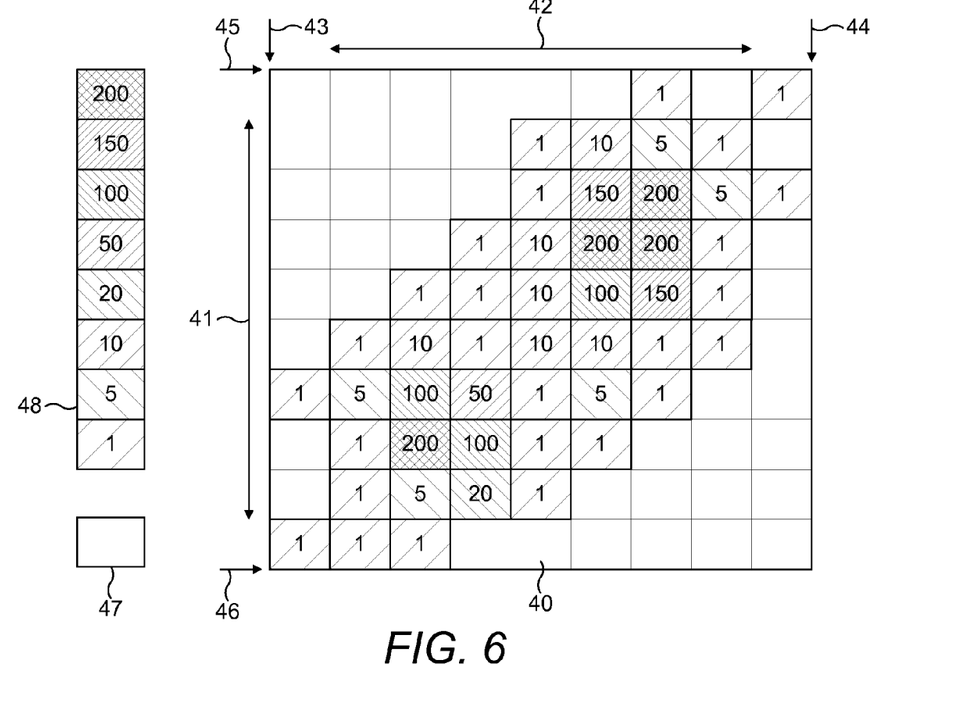
FIG. 6 is an example of a heat map generated in accordance with embodiments of the invention.

Preferably, each occupancy value is associated with a respective colour. Alternatively, the occupancy values may be divided into separate ranges of occupancy values and each range may be associated with a respective colour. A scale of the colours to which the occupancy values or ranges corresponds is provided. The scale may be logarithmic since tracked persons tend to spend long periods in few places. The heat map is generated on a web page in a web browser. FIG. 6 is an example of a heat map that may be displayed in accordance with the embodiments described above. Colours are replaced with hatched lines for clarity. The heat map includes a grid 40 forming boxes, in which each box represents one of the geographical regions. Some of the boxes each has a number indicated therein (which may not be present in heat maps according to other embodiments). This number is the occupancy value for the geographical region to which the box maps. The mapping of the boxes to geographical regions is indicated by scales of latitude and longitude (values not shown), indicated at 41 and 42. The maximum and minimum values 44, 43 for the longitude and the maximum and minimum values 45, 46 for the latitude define the area that the heat map covers. The area that each box represents is also indicated for ease of reference at 47 where, although not shown, in implementation the distances that the dimensions of the box represent would preferably be indicated. The boxes may also be filled with a shade of grey corresponding to a shade on the scale 48. Thus the occupancy values are represented as shades of grey. In a preferred embodiment, the occupancy values are represented as colours, preferably on a spectrum from yellow to red.

A user may change the criteria on which the occupancy values are generated to generate different heat maps. This allows different attributes of a tracked person's movement to be better understood.

Figure 7:
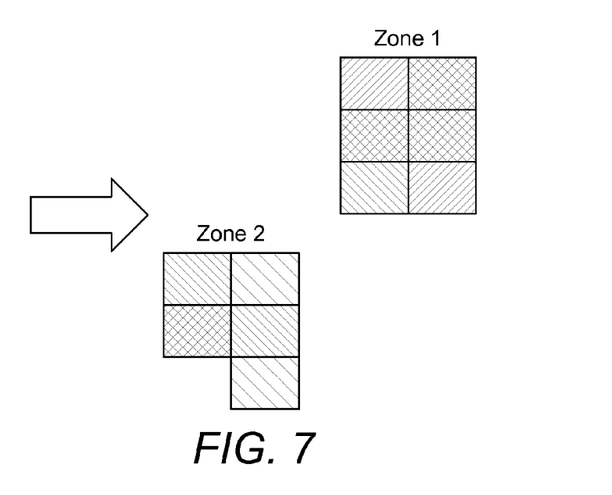
FIG. 7 illustrates how zones can be defined.

FIG. 7 indicates illustratively for better understanding how the zones in this heat map are defined in the example mentioned above. In this example the at least one criterion in step S14 for a zone is that the time spent in a connected set of squares must exceed X minutes and the at least one criterion at step S14' is that the connected set of squares must contain a total of at least Y minutes. In this case, X is set at 50 and Y is set at 400. In accordance with the steps of FIG. 5, a first zone and a second zone are defined and labelled "zone 1" and "zone 2", respectively. Optionally, the at least one zone is marked on the web page for the user.

Figure 8:
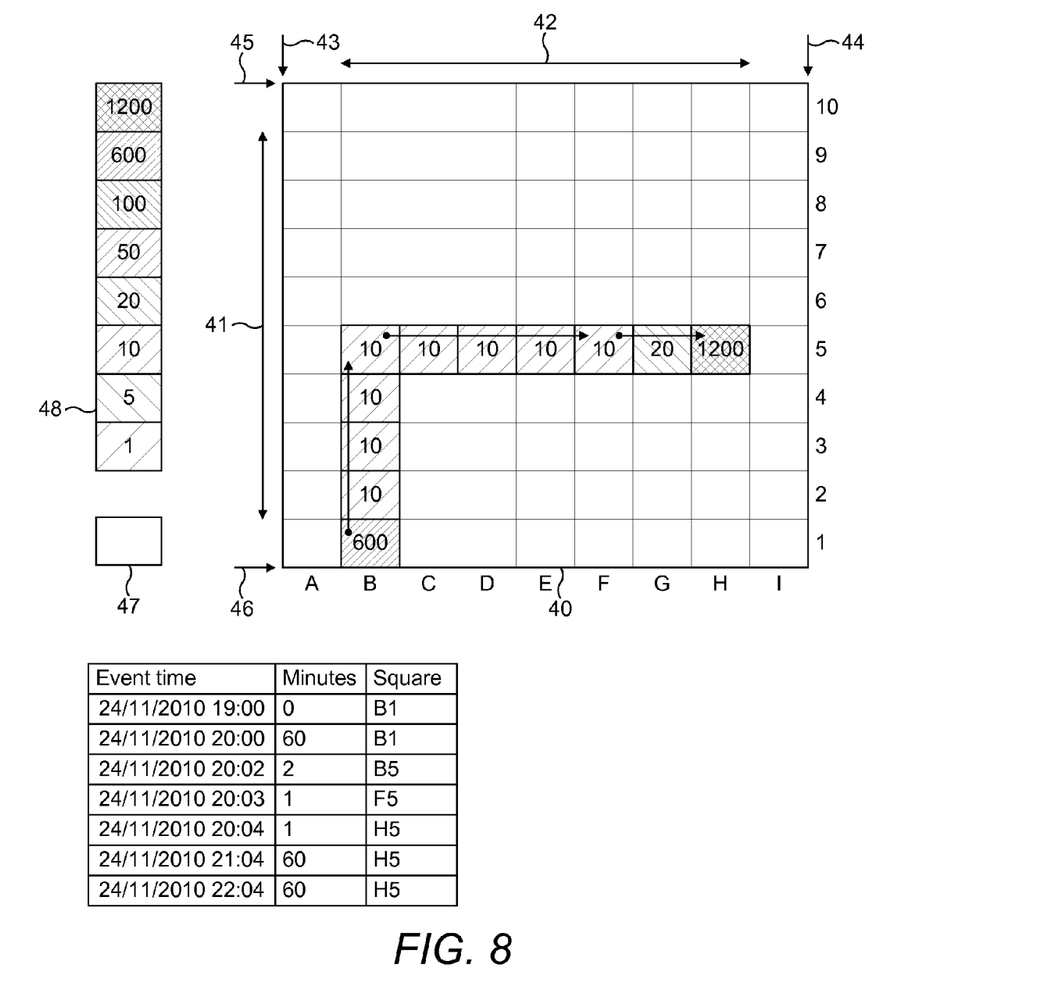
FIG. 8 is an example heat map generated in accordance with another embodiment of the invention.

FIG. 8 is an example of a heat map that may be displayed in accordance with the embodiments described above wherein the initial value is determined based on the length of time between consecutive location data. Elements like those in FIG. 6 are denoted with like reference numbers. FIG. 8 includes a table 52 indicating some information on which the occupancy values in the heat map are based. In this example, the occupancy threshold criterion is set at 400, so the geographical regions "B1" and "B5" are each a zone.

A heat map may overlay a map in a map application such as Google Earth. An image file for the heat map may first be generated (for example a .PNG or .GIF file). The image file can be imported, for example, to Google Earth via a KML file.

In embodiments of the invention, areas, referred to as "paths" or "secondary zones", are determined that are not within zones described above, but are frequently visited by the device 2. The zones described above are now referred to as primary zones for clarity. It is determined in the data processing application in the server 4, based on the location data, that at least one zone in which the occupancy of the device meets one or more criteria defined for a secondary zone.

Figure 9:
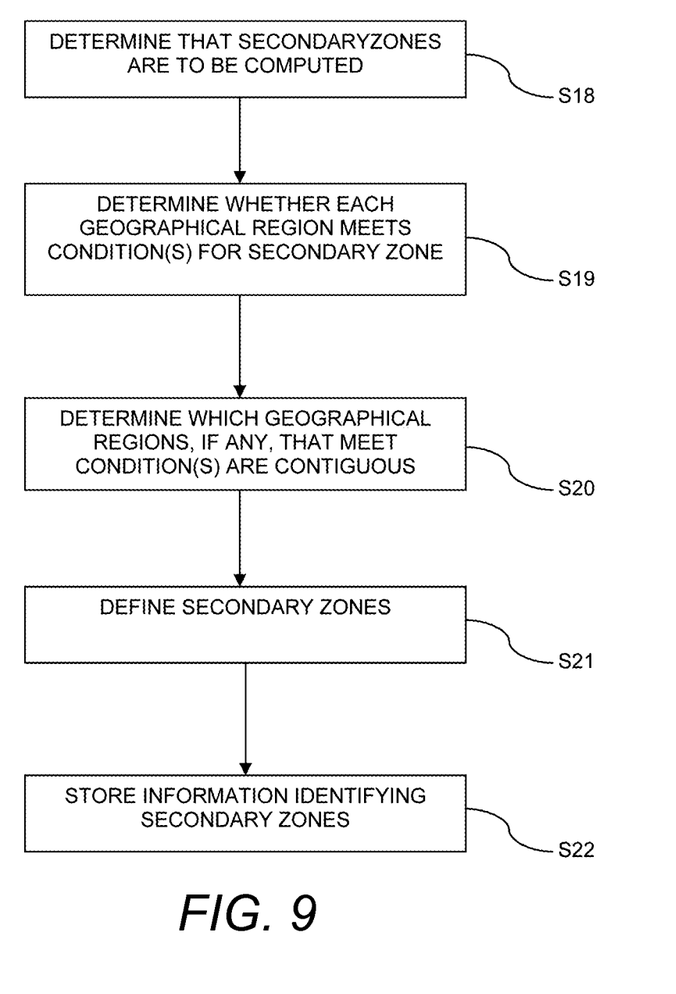
FIG. 9 is a flow chart indicating steps that take place in the server in accordance with embodiments of the invention to determine a secondary zone.

The or each secondary zone is determined in a similar manner to a zone. Referring to FIG. 9, the server 4 determines at step S18 that secondary zones are to be identified. The server 4 then determines in step S19 for each geographical region whether at least one criterion is met for the geographical region to be a secondary zone. In this embodiment, the criterion is that the occupancy value for that region exceeds a secondary zone occupancy threshold value but is less than the occupancy threshold value for a primary zone. The thresholds may be expressed as minimum and maximum absolute values or a proportion of total occupancy values, depending on the embodiment. A user at the third party user terminal 10 can configure the at least one criterion.

At step S20, the server 4 then determines whether any of the geographical regions identified as meeting the criteria for a secondary zone are contiguous, that is, connected at a border.

In step S21, any one or multiple contiguous regions of the geographical regions in which the device meets the at least one criterion are defined as secondary zones (or "paths") and are allocated a path identifier. Information identifying the secondary zones is then recorded as such in the zone definition store 36 at step S22.

Alternative embodiments and modification to embodiments described in relation to determination of occupancy values for a primary zone are also applicable to determining of a secondary zone.

Figure 10:
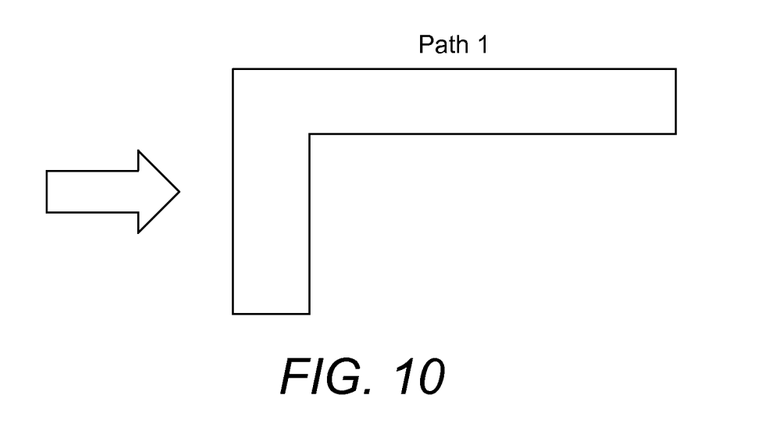
FIG. 10 illustrates an example of how a secondary zone can be defined.

An example secondary zone is shown illustratively in FIG. 10 for better understanding. The example secondary zone is determined based on the occupancy values for the example shown in FIG. 8. This example secondary zone is between the two zones identified in FIG. 8 and is labelled "Path 1". The secondary zone occupancy threshold value may be "5".

In an embodiment of the invention, an occupancy value is determined for each geographical zone for several time periods. The steps of FIG. 5 are performed for location data received for times in each time period to determine an occupancy value for each time period. The time period may be preconfigured, or determined by a user at the user terminal 12. For example, the time period may be one hour. In embodiments, one or more zones are determined for each time period in the manner described above.

A time-dependent heat map can be generated which represents occupancy of the device over each of the time periods in an animated image. This allows a user to better understand a tracked person's movements.

A set of occupancy values for a given time period can be compared with location data for a subsequent time to generate a matching ratio. The server can be configured to determine whether the ratio meets at least one condition, and if so cause a notification to be sent to a user or a third party such as the police. Thus, advantageously, real-time monitoring of tracked persons is possible. For example, the at least one condition might be that the device is outside or within a determined zone at a predetermined time.

Further, the set of occupancy values can be compared with another set of occupancy values for a subsequent time period to generate matching information. For example, a comparison could be made between occupancy values for today against occupancy values for the previous two weeks. If today's movement is entirely zones and secondary zones defined for the previous two weeks, the matching ratio is determined to be "typical". Otherwise, the movement is determined to be "atypical". If a tracked person spends time in areas not visited during the previous two weeks, the matching ratio represents the proportion of time spent in new areas. Therefore, the higher the matching ratio, the more "atypical" the movements.

The server can be configured to determine whether the matching information meets at least one condition to establish deviation from a pattern of location. If the at least one condition is met, the server may cause a notification to be sent to a user or a third party. Also, matching information or a derivative thereof can be included in a periodic report for a user.

In an embodiment, the server 4 can be configured to compare occupancy values to determine an association between two or more tracked persons. The association might be provided in the form of the matching ratio described above. The occupancy values and associated time periods for two tracked persons can be used to determine whether those persons were co-located both spatially and temporally.

It will be appreciated that various modifications could be made to the embodiments described above.

The invention is not limited to any particular way of automatically determining at least one zone and optionally secondary zone. In particular, it should be understood that ways of (including algorithms for) automatically defining a zone that do not require defining of geographical regions or determination of the location of a device in a particular region can be devised by the skilled person.

Highly accurate location determining technologies could be used to determine very accurate information on zones and paths, where each geographical zone might be of the order of 1 m². Such information might be used to monitor activity of a person, for example a person with impaired mobility.

In an embodiment, the zone is a three-dimensional zone. In this case the location data indicates location of the device in three dimensions. This embodiment may be particularly useful where a tracked person's environment includes a high rise building and there is scope for the person to move in three dimensions.

The third party terminal 10 is not essential for all embodiments of the invention as it is not essential for determining a zone. Also, the interface with the server 4 at the terminal 10 need not be implemented with a web browser. Instead software could be installed on the terminal 10 configured to communicate with the server 4. Also, the user terminal 10 could be in the form of a mobile device such as a PDA or an appropriately configured mobile phone and an application enabling a user to monitor activity of a tracked person could be downloaded and installed on that device.

The applicant hereby discloses in isolation each individual feature or step described herein and any combination of two or more such features, to the extent that such features or steps or combinations of features and/or steps are capable of being carried out based on the present specification as a whole in the light of the common general knowledge of a person skilled in the art, irrespective of whether such features or steps or combinations of features and/or steps solve any problems disclosed herein, and without limitation to the scope of the claims. The applicant indicates that aspects of the present invention may consist of any such individual feature or step or combination of features and/or steps. In view of the foregoing description it will be evident to a person skilled in the art that various modifications may be made within the scope of the invention.

The invention claimed is:

1. A computer-implemented method of defining a zone, comprising:
   receiving location data indicative of a location of a device carried by a user at a plurality of times;
   determining, based on the location data, information relating to an occupancy of the device in a plurality of predetermined, contiguous geographical regions, the geographical regions having a substantially equal size and a common shape;
   automatically defining, based on the information, at least one zone,
   wherein the at least one zone consists of multiple contiguous regions of the geographical regions in which the occupancy of the device meets at least one criterion, and
   wherein each of the plurality of predetermined contiguous geographical regions is defined independently of location areas over which base stations transmit and receive.

2. The method of claim 1, further comprising determining that at least two geographical regions in which the occupancy of the device meets the at least one criterion are contiguous.

3. The method of claim 1, wherein the information comprises an occupancy value for each of the geographical regions, wherein the method further comprises determining in each geographical region that the occupancy of the device meets the at least one criterion by comparing the occupancy value for each geographical region to a threshold occupancy value and determining that the occupancy value for each geographical region meets the at least one criterion based on a result of the comparison.

4. The method of claim 3, wherein determining an occupancy value for each of the geographical regions comprises:
   determining, based on the location data for each time, at least one geographical region to which a value should be assigned;
   assigning a value to the determined at least one geographical region; and
   summing the assigned values for each of the geographical regions to give the occupancy value.

5. The method of claim 4, further comprising determining the value to be assigned to each geographical region in dependence on an initial value.

6. The method of claim 5, wherein the initial value is a predetermined value for the location data for each time.

7. The method of claim 5, wherein the initial value is dependent on a determined time value indicative of time spent by the device in the at least one geographical region.

8. The method of claim 7, wherein the time value is dependent on the time interval between the times of the consecutive location data.

9. The method of claim 3, further comprising determining, at the processor, based on the location data, at least one secondary zone in which the occupancy of the device meets at least one second criterion, wherein the at least one second criterion is different to the at least one criterion that must be met for determining of the at least one zone.

10. The method of claim 9, wherein the at least one second criterion comprises a secondary threshold occupancy value, wherein determining at least one secondary zone comprises determining that the occupancy value for a region is greater than the secondary threshold occupancy value and less than the threshold occupancy value.

11. The method of claim 1, further comprising:
   determining if the location data for a time is indicative of a location of the device in the vicinity of a border between multiple geographical regions, and, if so, determining a value to assign to each of the multiple geographical regions.

12. The method of claim 11, wherein the multiple geographical regions comprise one, two, three or four of the geographical regions.

13. The method of claim 11, wherein, when a value is determined for multiple geographical regions for location data for a time, the value assigned to each of the multiple geographical regions is a proportion of the initial value.

14. The method of claim 1, wherein each region has an area of between 1000 and 40,000 square meters.

15. The method of claim 1, further comprising:
receiving further location data indicative of the location of the device at at least one other time over another time period;
determining, based on the further location data, information relating to the occupancy of the device in a plurality of geographical regions over the other time period; and
determining matching information indicative of a difference between the information based on the location data and the information based on the further location data.

16. The method of claim 15, further comprising:
determining that the matching information meets at least one condition; and
generating a notification for a user based on a result of the determining.

17. The method of claim 1, further comprising:
generating a heat map indicating the geographical regions and providing a visual indication of degree of occupancy of each geographical region; and
providing the heat map for display on a display.

18. A computer program embodied on a tangible, non-transitory computer readable memory comprising computer program code which, when run on a processing apparatus, performs the following steps:
receiving location data indicative of a location of a device at a plurality of times;
determining, based on the location data, information relating to an occupancy of the device in a plurality of predetermined geographical regions, the regions being contiguous to one another and having a substantially equal size and a common shape;
automatically defining, based on the information, at least one zone,
wherein the at least one zone consists of multiple contiguous regions of the geographical regions in which the occupancy of the device meets at least one criterion,
wherein each of the plurality of predetermined geographical regions is defined independently of location areas over which base stations transmit and receive.

19. An apparatus for defining a zone, comprising:
a receiver configured to receive location data indicative of a location of a device at a plurality of times; and
a processor configured to automatically define, based on the location data, information relating to an occupancy of the device in a plurality of predetermined geographical regions and to automatically define at least one zone based on the information, wherein the geographical regions are contiguous to each other and have a substantially equal size and a common shape; and
wherein the at least one zone consists of multiple contiguous regions of the geographical regions in which the occupancy of the device meets at least one criterion,
wherein each of the plurality of predetermined geographical regions is defined independently of location areas over which base stations transmit and receive.

* * * * *